(12) United States Patent
Gadkaree et al.

(10) Patent No.: US 9,129,756 B2
(45) Date of Patent: Sep. 8, 2015

(54) COMPOSITE ELECTRODE FOR LITHIUM ION CAPACITOR

(71) Applicant: Corning Incorporated, Corning, NY (US)

(72) Inventors: Kishor Purushottam Gadkaree, Painted Post, NY (US); Xiaorong Liu, Oneonta, NY (US)

(73) Assignee: Corning Incorporated, Corning, NY (US)

( * ) Notice: Subject to any disclaimer, the term of this patent is extended or adjusted under 35 U.S.C. 154(b) by 205 days.

(21) Appl. No.: 13/852,053

(22) Filed: Mar. 28, 2013

(65) Prior Publication Data

US 2014/0293507 A1  Oct. 2, 2014

(51) Int. Cl.
*H01G 11/06* (2013.01)
*H01G 11/46* (2013.01)
*H01G 9/00* (2006.01)
*H01G 11/50* (2013.01)

(52) U.S. Cl.
CPC ............ *H01G 11/46* (2013.01); *H01G 9/0029* (2013.01); *H01G 11/06* (2013.01); *H01G 11/50* (2013.01); *Y02E 60/13* (2013.01); *Y10T 29/417* (2015.01)

(58) Field of Classification Search
None
See application file for complete search history.

(56) References Cited

U.S. PATENT DOCUMENTS

| | | |
|---|---|---|
| 2008/0112112 A1 | 5/2008 | Takemura et al. |
| 2008/0297981 A1 | 12/2008 | Endo et al. |
| 2010/0221613 A1* | 9/2010 | Ueki et al. ............... 429/231.95 |
| 2011/0091771 A1* | 4/2011 | Sannan et al. ................ 429/217 |
| 2012/0050952 A1 | 3/2012 | Choi et al. |
| 2012/0063059 A1* | 3/2012 | Ra et al. ........................ 361/502 |
| 2012/0099246 A1 | 4/2012 | Cho et al. ..................... 361/505 |
| 2012/0156572 A1* | 6/2012 | Hojo et al. .................... 429/332 |
| 2012/0212879 A1 | 8/2012 | Li et al. |

FOREIGN PATENT DOCUMENTS

| | | |
|---|---|---|
| EP | 1239495 | 9/2002 |
| EP | 2555285 | 2/2013 |
| WO | 2011/052852 | 5/2011 |

OTHER PUBLICATIONS

H. Zheng, et al., "Hard carbon: a promising lithium-ion battery anode for high temperature applications with ionic electrolyte", *RSC Advances*, 2012, vol. 2, pp. 4904-4912.
PCT/US2014/031406 Search Report.

* cited by examiner

*Primary Examiner* — Dion R Ferguson
(74) *Attorney, Agent, or Firm* — John L. Haack; Michael W. Russell

(57) ABSTRACT

A lithium-ion capacitor includes a cathode, an anode, and a porous separator positioned between the cathode and the anode. The cathode is formed using activated carbon, and the anode is formed from a composite material that includes lithium titanium oxide and a carbon material such as hard carbon or graphite.

18 Claims, 4 Drawing Sheets

COMPOSITE ELECTRODE FOR LITHIUM ION CAPACITOR

BACKGROUND

1. Field

The present disclosure relates generally to electrochemical energy storage devices, and more specifically to lithium-ion capacitors and their methods of production.

2. Technical Background

Capacitors, including double layer capacitors (e.g., ultracapacitors), have been utilized in many electrical applications where a pulse of power is required. Lithium-ion capacitors, which contain a faradaic electrode (anode) and an activated carbon electrode (cathode) where there are no faradaic reactions, may have a significantly higher power density than standard ultracapacitors.

Lithium-ion capacitors have advantages associated with a battery (with respect to their high energy density) and a capacitor (with respect to their high power capability). For instance, lithium-ion capacitors can provide higher operating voltage (~3.8-4V) compared to a typical electric double layer capacitor (EDLC) device voltage of 2.5 to 2.7V.

Lithium-ion capacitors have been proposed to address the insufficient energy density in ultracapacitors and other standard capacitors. For lithium-ion based capacitors, however, currently-proposed models require that a lithium metal electrode be incorporated into the device, in addition to the cathode and the anode. The result is an electrochemical energy storage device with effectively three electrodes (cathode, anode, and lithium metal electrode).

Such three electrode devices require the use of a porous cathode in conjunction with a mesh-type current collector in order to facilitate transport of lithium into and within the cell. The fabrication of porous electrodes and the construction of the overall three-electrode capacitor design can be complicated, and such a cell may be expensive to manufacture. Additionally, the presence of a lithium metal electrode in the capacitor presents design challenges, as lithium metal is potentially combustible in the presence of air.

BRIEF SUMMARY

In accordance with embodiments of the present disclosure, a lithium-ion capacitor comprises a cathode, an anode, and a porous separator positioned between the cathode and the anode, wherein the cathode comprises activated carbon, and the anode comprises lithium titanium oxide (LTO) and a carbon material selected from the group consisting of hard carbon and graphite. Specifically, the anode, which comprises a composite of LTO and the carbon material, can effectively limit the voltage imposed on the cathode to below the stability limit of the cathode, which enables operation of the lithium-ion capacitor at elevated potentials and the attendant realization of a higher energy density and a higher power density.

In operation, an electrolyte solution can be incorporated throughout cathode, anode and separator. The electrolyte solution comprises an electrolyte material (solute) dissolved in a solvent.

Optionally, the lithium-ion capacitor may further include lithium composite particles formed on a separator-facing surface of at least one of the cathode and the anode. The lithium composite particles comprise a lithium metal core and a layer of a complex lithium salt encapsulating the core. In such an embodiment, in an assembled structure, the solvent from the electrolyte may dissolve the complex lithium salt such that the electrolyte material comprises or consists essentially of the complex lithium salt. Thus, the lithium composite particles may be a source of both electrolyte material and lithium for the capacitor. Following dissolution of the lithium composite material, in a related embodiment, a lithium-ion capacitor comprises a cathode, an anode, a separator positioned between the cathode and the anode, and an electrolyte solution, i.e., the capacitor is free of a third, lithium metal electrode.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
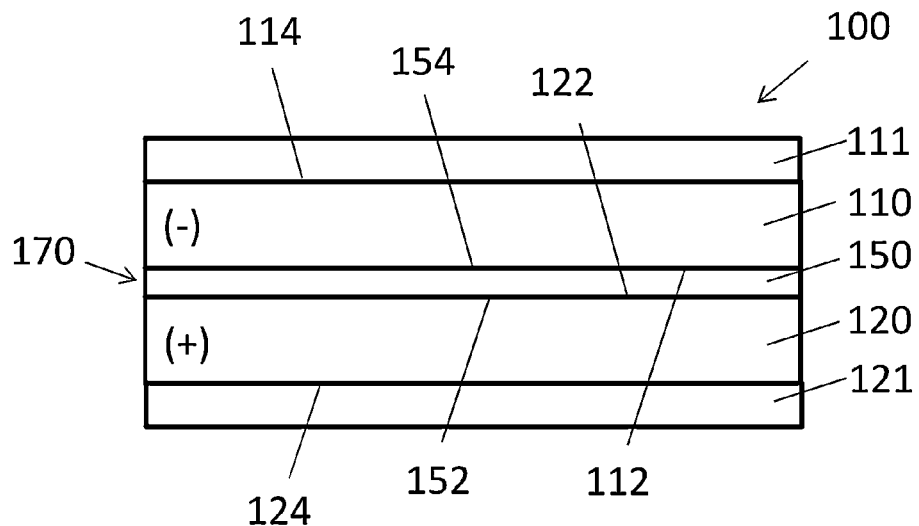
FIG. 1 is a schematic diagram of a lithium-ion capacitor according to one embodiment.

Reference will now be made in greater detail to various embodiments of the subject matter of the present disclosure, some embodiments of which are illustrated in the accompanying drawings. Whenever possible, the same reference numerals will be used throughout the drawings to refer to the same or similar parts.

Referring now to FIG. 1, a lithium-ion capacitor 100 according to one embodiment comprises a cathode 120, an anode 110, and a separator 150 in a stacked configuration. The cathode 120 comprises an outer surface 124 and a separator-facing surface 122, and the anode 110 comprises an outer surface 114 and a separator-facing surface 112. As illustrated, the separator 150 is positioned between the cathode 120 and the anode 110, such that the separator 150 comprises a cathode-facing surface 152 and an anode facing surface 154.

The separator 150 may be a lithium ion-permeable membrane configured to be positioned between the cathode 120 and anode 110 that keeps the anode and cathode from contacting each other.

The cathode 120 includes a cathode material that may comprise activated carbon, or any other suitable cathode material for a lithium-ion capacitor. As used herein, an activated carbon material has a specific surface area greater than about 500 $m^2/g$. In embodiments, the activated carbon material used to form the cathode may have an average particle size of less than 100 microns, e.g., less than 100, 10 or 5 microns. A thickness of the activated carbon-containing layer can range, for example, from 25 to 600 microns.

The anode 110 includes a composite anode material that comprises lithium titanium oxide, which is also referred to as lithium titanate (e.g., $Li_4Ti_5O_{10}$ and/or $Li_2TiO_3$), and a carbon material such as hard carbon or graphite, or combinations thereof. Hard carbon material, as used herein, has a specific surface area less than about 500 $m^2/g$, e.g., less than about 100 $m^2/g$. The hard carbon material, if used to form the anode, is non-graphitizable and has an average particle size of less than 100 microns, e.g., less than 100, 10 or 5 microns. The graphite material, if used to form the anode, can have an average particle size of less than 100 microns, e.g., less than 100, 10 or 5 microns. A thickness of the LTO/carbon layer can range, for example, from 25 to 600 microns.

Incorporation of the LTO-containing composite anode into the capacitor eliminates the need for a separate lithium metal electrode. In turn, the electrochemical performance of the capacitor may be improved due to the omission of the lithium metal electrode and the attendant volume and weight savings for the overall cell. In example embodiments, a lithium-ion capacitor comprising a composite electrode that includes LTO and hard carbon, or LTO and graphite, can exhibit higher voltage stability than lithium-ion capacitors comprising a conventional anode. In an improved device, the LTO-containing anode can effectively limit the voltage imposed on the cathode to below the stability limit of the cathode, which enables operation of the lithium-ion capacitor at potentials greater than 3 V, e.g., about 3.8 V. Operation at higher voltages leads directly to a beneficial increase in the achievable energy density and power density. Without wishing to be bound by theory, improved stability of lithium-ion capacitors that include an LTO-containing anode is believed to be due to the lower (more negative) open circuit potential of the anode that results from the formation of lithium carbide ($LiC_x$) at the anode during operation. These as well as other benefits of the lithium-ion capacitors of the current disclosure are described in detail herein.

The composite anode can be formed from a mixture of LTO and one or both of hard carbon or graphite in a suitable ratio. In embodiments, the amount of LTO in the composite electrode can range from about 5 wt. % to 50 wt. % (e.g., 5, 10, 20, 30, 40 or 50 wt. %). The cathode as well as the anode may be formed by casting (e.g., tape casting) a slurry mixture of the associated components. A cathode slurry may comprise activated carbon and an optional binder, and an anode slurry may comprise hard carbon and/or graphite, an optional binder and an optional source of conductive carbon such as carbon black. Example binders include polyvinylidene fluoride (PVDF) and polytetrafluoroethylene (PTFE).

For each of the cathode and the anode, the amount of binder incorporated into the electrode may range from 0 wt. % to 20 wt. %, e.g., 5 wt. % to 10 wt. % of the overall electrode composition. For the anode, the amount of conductive carbon incorporated into the electrode may range from 0 wt. % to 10 wt. %, e.g., about 5 wt. % of the overall anode composition.

In some embodiments, the cathode 120, which comprises activated carbon, may be porous, while the composite anode 110 may be porous or non-porous and may, for example, be impermeable to liquids including solvents used to form an electrolyte solution. The cathode 120 and anode 110 may be attached to respective positive and negative current collectors 121, 111. The current collectors may comprise a metal foil such as aluminum foil Of copper foil.

The cathode 120, anode 110, separator 150 and current collectors when assembled may collectively be referred to as an electrode set. In conventional lithium-ion capacitors, the electrode set may further comprise a lithium metal electrode. According to the present disclosure, lithium-ion capacitor 100 does not contain a lithium metal electrode. In some embodiments, the electrode set may consist essentially of cathode 120, anode 110, and separator 150, or consist essentially of a cathode 120, anode 110, separator 150 and respective current collectors.

A liquid electrolyte solution 170 may be incorporated between the cathode 120 and anode 110 such that the electrolyte solution permeates the separator 150. The electrolyte solution 170 may comprise an electrolyte material (solute) dissolved in a suitable solvent. The electrolyte material may be any material capable of functioning in an electrochemical device. In embodiments, the electrolyte material may be a lithium salt, i.e., a complex lithium salt such as $LiPF_6$, $LiBF_4$, $LiClO_4$, $LiAsF_6$, or $LiF_3SO_3$, as well as mixtures thereof. Example solvents for forming an electrolyte solution include organic solvents or mixtures of organic solvents such as dimethyl carbonate, methyl propionate, ethylene carbonate, propylene carbonate, diethyl carbonate as well as other solvents suitable for use in an electrolyte where the lithium-ion is the charge carrier. In some embodiments, the solvent may be capable of dissolving the electrolyte material of the lithium composite material.

Figure 2:
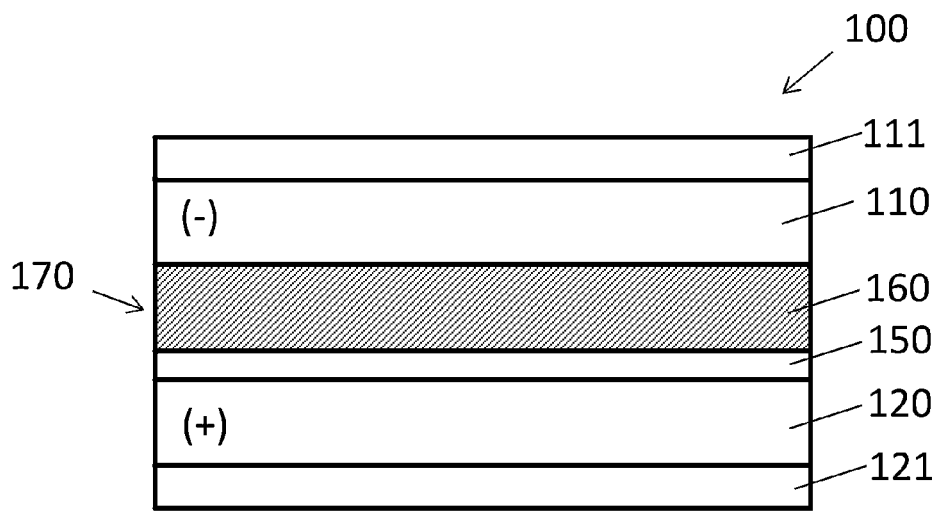
FIG. 2 is a schematic diagram of a lithium-ion capacitor according to a further embodiment.

In various embodiments, an optional lithium composite material may be positioned between the anode and the cathode. For example, a lithium composite material may be provided on a separator-facing surface of the anode or on a separator-facing surface of the cathode. A schematic of a modified electrode set, comprising a layer of lithium composite particles 160 formed over the separator-facing surface 112 of the composite anode 110 is shown in FIG. 2.

The lithium composite material comprises a lithium metal core and a layer of a complex lithium salt that encapsulates the core. In one embodiment, the lithium composite material may include a plurality of stabilized lithium composite particles each having a core and a coating material of a complex lithium salt surrounding and encapsulating the core.

In constructing the lithium-ion capacitor, stabilized lithium composite particles may be used as a source of at least a portion of the electrolyte material and at least a portion of the lithium metal used by the cell. For example, the complex lithium salt that encapsulates the lithium metal core of the composite particles may dissolve in the electrolyte solvent of an assembled cell and constitute a portion, or substantially all, of the electrolyte material in the electrolyte solution. During use of the lithium-ion capacitor, i.e., as a consequence of charging and discharging the cell, the complex lithium salt coating on the lithium composite particles may partially or completely dissolve into and form a component of the electrolyte solution.

A complex lithium salt is any ionic compound comprising lithium and an additional metal, metalloid or non-metal atom that does not itself ionize and which is soluble in an organic solvent. For instance, $LiPF_6$ contains lithium and phosphorus as metal atoms, but the phosphorus does not ionize by itself. Rather, phosphorus ionizes as the $PF_6^-$ ion. In a further example, $LiBF_4$ contains lithium metal and the metalloid boron. Although lithium ionizes ($Li^+$), boron does not ionize by itself, but as the $BF_4^-$ ion. In a still further example, $LiClO_4$ contains lithium metal and the non-metal atoms chlorine and oxygen. The non-metal atoms ionize as the perchlorate ion ($ClO_4^-$). The solvent may be any suitable solvent for use in an electrochemical energy storage device.

In the illustrated embodiment of FIG. 2, composite lithium particles 160 are disposed on a separator-facing surface 112 of the anode 110. In a related (non-illustrated) embodiment, composite lithium particles 160 may be disposed on an anode facing surface 154 of the separator 150. The composite lithium particles may be incorporated into the device as a contiguous or non-contiguous layer.

The amount of composite lithium particles incorporated into the device may be chosen to provide the desired amount of supplemental lithium metal (from the core of the composite particles), the desired amount of supplemental electrolyte material (from the complex lithium salt layer that encapsulates the core), or both.

The lithium composite particles described herein generally comprise a core and a coating that encapsulates the core. The core may comprise lithium metal or a lithium metal alloy. The coating, which comprises a lithium salt, surrounds and encapsulates the core. The coating may be hermetic and thus prevent or substantially inhibit water or air, including oxygen, from contacting and reacting with the core. A stabilized lithium composite material may be substantially non-reactive or non-combustive if exposed to air, oxygen or water, such as an ambient environment. Thus, in embodiments the composite particles are stabilized with respect to ambient exposure.

Figure 3:
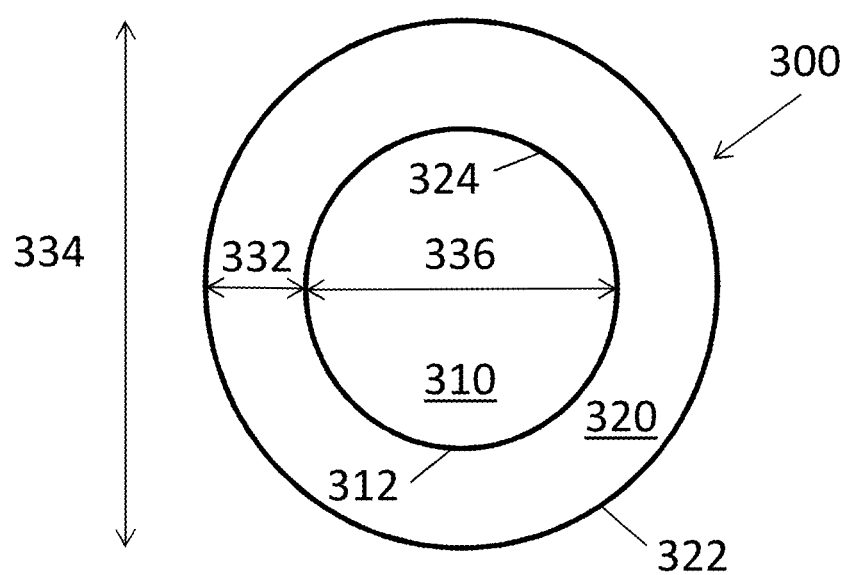
FIG. 3 is a cross-sectional view of a lithium composite particle.

A single, stabilized lithium composite particle 300 is shown schematically in cross-section in FIG. 3. Particle 300 includes a core 310 and a coating 320 that completely surrounds and encapsulates the core. The core 310 may comprises a unitary body defining an outer surface 312. The coating 320 is in direct physical contact with the outer surface 312 of the core 310 along an inner surface 324 of the coating 320. The coating is inorganic and is free of organic species such as mineral oil.

The core 310 in some embodiments comprises lithium metal, sometimes referred to as elemental lithium. In further embodiments, the core may comprise an alloy of lithium. Examples of such alloys comprise lithium and one or more of Al, Si, Ge, Sn, Pb and Bi. The coating 320 comprises a lithium salt that may include a complex lithium salt such as $LiPF_6$, $LiBF_4$, $LiClO_4$, $LiAsF_6$, or $LiF_3SO_3$, as well as mixtures thereof. Such a salt is soluble in standard organic solvents, including dimethyl carbonate, methyl propionate, ethylene carbonate, propylene carbonate, and diethyl carbonate.

As illustrated in FIG. 3, the core 310 has a particle size 336, and the stabilized lithium particle 300 has a particle size 334. The term "particle size" is used to describe the maximum linear dimension associated with a particle. In the case of a spherical particle, for example, the particle size is the diameter. In the case of an oblong particle, the particle size is the "length" of the particle. An example average particle size for a plurality of composite particles 300 may range up to about 500 microns, e.g., from about 5 microns to 500 microns, such as 5, 10, 20, 50, 300, 150, 200, 300, 400 or 500 microns, and may be defined for a given material batch over a range of any two of the aforementioned values.

The coating 320 has a thickness 332 defined as the average shortest distance between the inner surface 324 of the coating and the outer surface 322 of the coating. In embodiments, the coating may have a substantially uniform thickness or a variable thickness depending, for example, on the method used to form the coating. An example average thickness for the coating 324 may range from about 10 nm to 300 microns, e.g., 0.01, 0.02, 0.05, 0.1, 0.2, 0.5, 1, 2, 5, 10, 20, 50 or 300 microns, which may be defined for a given material batch over a range of any two of the aforementioned values.

In some embodiments, the stabilized lithium composite particle 300 may be substantially spherically shaped. However, other shapes are contemplated herein, such as, but not limited to asymmetric shapes or spheroids.

The stabilized lithium composite particles 300 are substantially non-reactive or non-combustive if exposed to air, oxygen or water. The coating 320 encapsulates the lithium core 310 to substantially inhibit or prevent exposure and reaction of the lithium with ambient gases or liquids. The stabilized lithium composite particles 300 may be substantially chemically inert, for example, to ambient exposure or to elevated temperature (e.g., 50° C., 300° C., 150° C. or even 200° C.) exposure to air, oxygen or water vapor. The stabilized lithium composite particles may be sufficiently stable to be stored in air for at least one week, 2 weeks, 1 month, or even a year without substantial chemical degradation and/or combustion.

A lithium-ion capacitor according to one embodiment includes a composite anode, a cathode, and a separator disposed between the anode and the cathode. The composite anode comprises lithium titanium oxide (LTO) and a carbon material such as hard carbon or graphite, or combinations thereof.

A lithium-ion capacitor according to a further embodiment includes a composite anode, a cathode, a separator disposed between the anode and the cathode, and lithium composite particles disposed between the anode and the separator. Upon addition of a liquid electrolyte (or electrolyte solvent) to the system, the lithium salt that coats the lithium composite particles may dissolve into and thus form a component of the electrolyte solution. The electrolyte solvent may be selected and provided in an amount sufficient to contact and dissolve the complex some or substantially all of the lithium salt of the lithium composite material 160.

One method of forming a lithium-ion capacitor comprises assembling an electrode set comprising a cathode, a composite anode, and a separator disposed between the anode and the cathode, and then adding an electrolyte solution to the assembly. In a further method, lithium composite particles are disposed between the anode and the separator prior to adding an electrolyte solution to the assembly.

Stabilized lithium composite particles may be produced by providing lithium metal particles, and contacting the lithium metal particles with a coating solution that includes a coating material dissolved in a solvent. The coating material may include a lithium salt or complex lithium salt as described above. The contacting may be performed by immersing the particles in the solution or by other means such as spray coating. After coating the particles, the solvent is removed to form a layer of the coating material over the lithium metal particles. Removal of the coating solvent may be performed by evaporation.

Due to its high reactivity and flammability, lithium metal is often stored under the cover of a viscous hydrocarbon such as mineral oil. While the mineral oil encapsulant inhibits degradation of the lithium metal, it is generally incompatible with most solid state devices. With the present stabilization approach, the lithium particles are safe to handle and store, and can be incorporated into a lithium-ion device directly in their stabilized form.

In an embodiment, stabilized lithium composite particles may be produced by initially providing lithium metal or lithium metal-containing particles that are immersed in mineral oil. Prior to forming the inorganic coating over the particles, the mineral oil is stripped from the particles under controlled conditions. By way of example, the mineral oil may comprise silicone oil. Lithium metal particles suspended in silicone oil are commercially available from Sigma-Aldrich of St. Louis, Mo.

Mineral oils such as silicon oil may be removed from the lithium particles by washing with a suitable cleaning solvent such as tetrahydrofuran (THF) or methylene chloride. A vacuum filtration system, for example, may be used to wash the lithium particles. Due to the volatility of the lithium, both the washing to remove an organic encapsulant and the act of contacting the lithium metal particles with a coating solution comprising a lithium metal salt to form the inorganic encapsulant can be carried out in a controlled atmosphere such as a glove box that is free or substantially free of oxygen and water. Prior to contacting the lithium metal particles with a coating solution, the washed lithium particles can be dried. The washed particles can be dried by heating the particles to evaporate the solvent, e.g., up to a drying temperature of about 300° C.

To form the inorganic coating, a lithium salt is initially dissolved in a coating solvent to form a coating solution. Suitable solvents are capable of dissolving the lithium salt. Example coating solvents include THF, n-methyl pyrrolidone (NMP), methylene chloride, or combinations thereof.

After contacting the lithium particles with the coating solution, the coating solvent can be removed to form a coating of the lithium salt over the particles. The solvent may be removed by evaporation, which may either occur naturally under environmental conditions of the preparation process or may be forced through various techniques including vacuum techniques. For example, THF may be liberated through evaporation at room temperature and with no vacuum. In a further example, NMP may be removed by heating optionally with the application of vacuum. In various embodiments, removal of the coating solvent may be performed at room temperature or by heating to a temperature of at most about 150° C., e.g., about 30, 50, 75 or 300° C.

The thickness 332 of the coating 320 may be determined by controlling the concentration of the lithium salt in the coating solution. Generally, a higher salt content in the solution will produce a thicker coating. A concentration in the coating solution of the lithium salt may range from about 0.1 to 4 molar, e.g., 0.1, 0.2, 0.5, 1, 2, 3 or 4 molar. In embodiments, the coating solution comprises a saturated solution of the lithium salt.

In the resulting stabilized lithium composite particles, the lithium salt coating may comprise from about 1 to 50 wt. % of the total mass of the particles. For instance, the coating may comprise 1, 2, 5, 10, 20, 30, 40 or 50 wt. % of the total mass. Together with the composition, this thickness of the coating is chosen to provide an effective barrier to the diffusion of air, oxygen and water.

EXAMPLES

Lithium-ion button cell capacitors were prepared with various anode structures.

Example 1

Graphite Anode (Comparative)

To form a comparative anode, a graphite slurry was prepared by mixing 100 g graphite powder (Aldrich), 2 g carbon black (Cabot Corporation), 10 g polyvinylidene fluoride (PVDF) (Alfa Aesar) and 190 g N-methyl-2-pyrrolidone (NMP) solvent (Sigma-Aldrich) to form a smooth slurry. The slurry was dispersed to a thickness of about 1 mm onto copper foil using a doctor-blade. The graphite slurry-coated copper foil was initially dried in a fume hood, vacuum dried in a 120° C. oven, and then diced into 1.4 cm diameter electrodes. The typical thickness of the graphite electrodes (graphite plus copper current collector) was about 17 mm.

To form the cathode, activated carbon films were made by grinding activated carbon powder and PTFE binder at a ratio of 90:10 by weight at a speed of 350 rpm to form a mixture that was rolled into a thin sheet. A typical thickness of the activated carbon layer was about 13 mm. The activated carbon was laminated onto aluminum foil (25 micron thickness) using carbon ink, and the resulting laminate was cut into 1.4 cm diameter electrodes.

Lithium-ion capacitors were assembled using CR2032 button cell cases with Al-clad (MTI Corporation) packages. The stacked electrode set included, in order, aluminum current collector/activated carbon cathode/paper separator/(optional layer of lithium composite particles)/composite anode/copper current collector. The electrolyte solution (~0.3 g of electrolyte per button cell) was prepared using a 1M solution of $LiPF_6$ in a 1:1 by volume mixture of ethylene carbonate (EC) and dimethyl carbonate (DMC) solvents. Button cells were sealed using a crimping machine.

The lithium-ion button cell capacitors were first tested using cyclic voltammetry at a scan rate of 1 mV/s, with an operating voltage ranging from 2.2V to 3.8V. The capacities of lithium-ion capacitors were determined at constant current discharge (1 mA) after holding at 3.8V for 2 h. Power capabilities were measured at various currents after holding at 3.8V for 1 h. Energy and power densities based the volume of electrodes and separators were calculated by integrating discharge curves.

Example 2

LTO Anode (Comparative)

LTO electrode ink was prepared by mixing 0.40 g of LTO (Aldrich), 0.05 g of carbon black (Cabot Corporation), 0.05 g of PVDF and 4.00 g of NMP in a mortar. The ink mixture was dispersed onto copper foil (25 microns) using a pipette and dried at ambient atmosphere for two days. The resulting electrode sheet was further dried in a vacuum oven at 120° C. overnight. The dried electrode sheet was cut into discs with a diameter of 1.4 cm.

An activated carbon cathode was prepared according to the method described in Example 1.

The LTO electrode (220 microns, 56.3 mg) and the activated carbon electrode (240 microns, 46.0 mg) electrode were assembled into a coin cell capacitor (together with the liquid electrolyte) according to the method described in Example 1.

Figure 4:
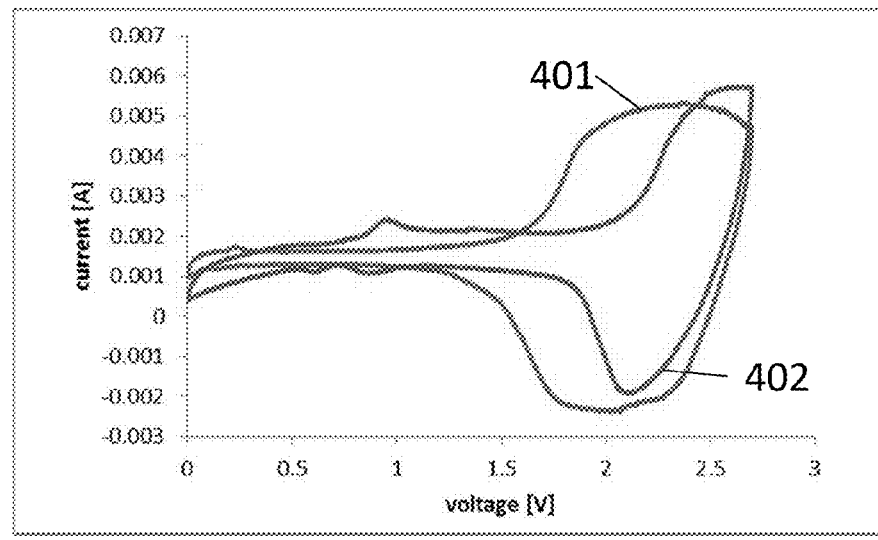
FIG. 4 shows cyclic voltammograms of a comparative lithium-ion capacitor.

The CV response of the assembled cell when held for 7 hours at 2.7 V is shown in FIG. 4. A first cycle is shown as line 401 and a second cycle is shown as line 402. The CV curves are distorted and exhibit a demonstrable decline in performance between the initial cycle and the second cycle. The energy density and power density of the device are summarized in Table 1.

TABLE 1

Energy density and power density - LTO anode (comparative)

| Current [A] | Energy Density [Wh/l] | Power Density [W/l] |
|---|---|---|
| 0.001 | 18.6 | 23.8 |
| 0.005 | 18.4 | 115.1 |
| 0.01 | 15.4 | 220.0 |
| 0.02 | 10.9 | 407.2 |
| 0.05 | 2.9 | 907.9 |
| 0.1 | 0.3 | 1596.4 |

Example 3

14.6% LTO-Hard Carbon Composite Anode

Ground phenolic resin was heated to 1000° C. at a heating rate of 200° C./hour, held at 1000° C. for 2 hours to carbonize the resin, and then cooled to room temperature. The thermal cycle was performed under $N_2$ atmosphere with a gas flow rate of 6.18 l/min. The resulting carbon was soaked in 37% HCl overnight and rinsed with deionized water to remove trace impurities. The sample was further soaked in a 29% $NH_4OH$ aqueous solution overnight, followed by rinsing with deionized water. The purified hard carbon was heated at 1000° C. for 2 hours under $N_2$ atmosphere. Carbon slurry was prepared using 42.5 g of the resulting hard carbon powder, 5 g PVDF, 2.5 g carbon black and 120 ml NMP solvent.

A composite anode comprising hard carbon and LTO was prepared by mixing the carbon slurry (5.85 g solids) with 1 g of LTO powder using a pestle. The composition of the mixture included 14.6 wt. % LTO, 72.6 wt. % hard carbon, 8.5 wt. % PVDF and 4.3 wt. % carbon black.

Composite LTO-hard carbon electrodes were prepared by dispensing the composite slurry onto copper foil (25 microns) using a doctor-blade. The copper foil loaded composite slurry was dried initially in a fume hood, and then dried overnight at 120° C. in a vacuum oven. The dried anode sheet was cut into discs with a diameter of 1.4 centimeter. A typical thickness of the composite electrode is about 350 microns.

Lithium composite particles were provided having a lithium metal core and a $LiPF_6$ layer encapsulating the core. Commercially-available lithium metal particles in silicone oil were first washed and filtered with THF under controlled atmosphere to remove the silicone oil. The particles were dried and transferred to a dish containing a 2M coating solution of $LiPF_6$ dissolved in THF. The solvent evaporates under ambient conditions to produce stabilized, $LiPF_6$-coated lithium composite particles. The amount and concentration of the coating solution was controlled to produce composite particles where, upon drying, the weight ratio of $LiPF_6$ (coating) to lithium metal (core) is about 20:80.

Figure 5:
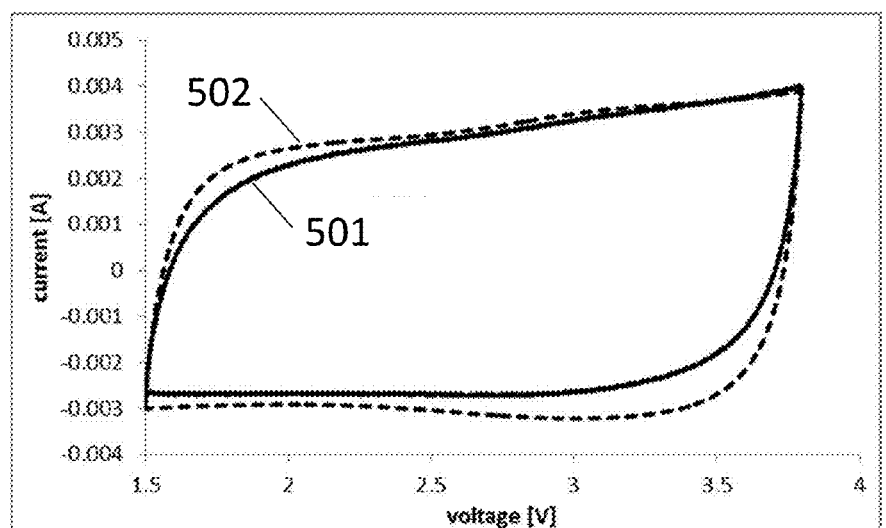
FIG. 5 shows cyclic voltammograms of an example lithium-ion capacitor.

The CV response of the assembled cell when held for 7 hours at 3.8 V is shown in FIG. 5. A first cycle is shown as line 501 and a second cycle is shown as line 502. It can be seen that the voltammograms have a rectangle shapes, which indicates that the lithium-ion capacitor had good capacitive behavior. The energy density and power density of the device are summarized in Table 2.

TABLE 2

Energy density and power density - LTO-hard carbon anode

| Current [A] | Energy Density [Wh/l] | Power Density [W/l] |
|---|---|---|
| 0.001 | 38.1 | 26.7 |
| 0.005 | 35.3 | 132.4 |
| 0.01 | 32.2 | 261.3 |
| 0.02 | 26.7 | 508.4 |
| 0.05 | 14.3 | 1186.6 |
| 0.1 | 4.1 | 2236.1 |

Example 4

20% LTO-Hard Carbon Composite Anode

Example 3 was repeated using 20 wt. % LTO in the composite electrode.

Example 5

38.6% LTO-Hard Carbon Composite Anode

Example 3 was repeated using 38.6 wt. % LTO in the composite electrode.

Figure 6:
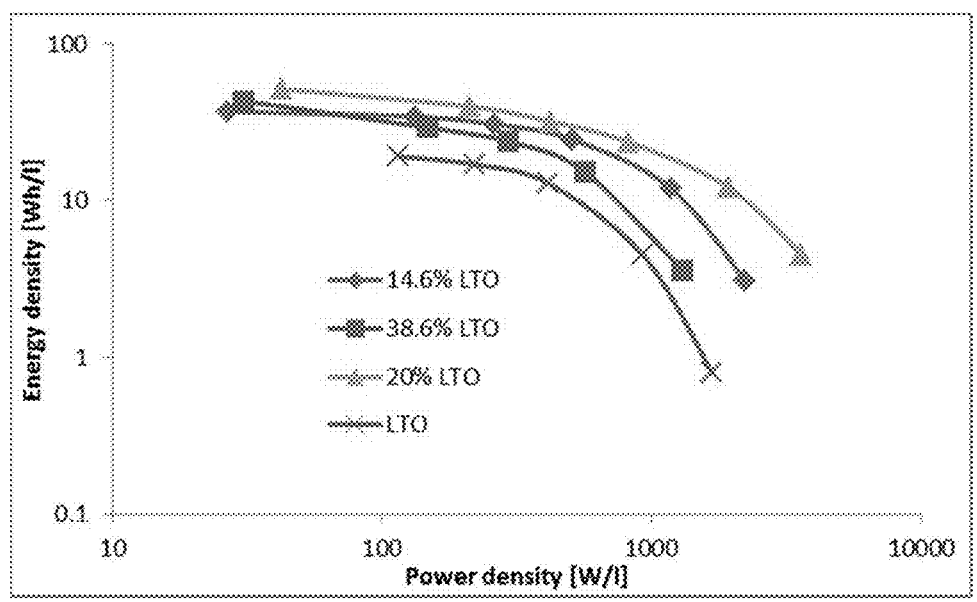
FIG. 6 is a series of Ragone plots for example lithium-ion capacitors.

FIG. 6 is a Ragone plot (power density versus energy density) for Examples 2-5. The data in FIG. 6 show that the inventive composite anode-based capacitors of Examples 3-5 exhibit a comparatively higher energy density and power density as compared to the LTO anode capacitor of Example 2. Further, the energy density and power density of the 20 wt. % LTO composite anode were higher than the energy density and power density for the 14.6 wt. % composite anode and the 38.6 wt. % composite anode.

As used herein, the singular forms "a," "an" and "the" include plural referents unless the context clearly dictates otherwise. Thus, for example, reference to a "glass" includes examples having two or more such "glasses" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an anode that comprises lithium titanium oxide and a carbon material selected from the group consisting of hard carbon and graphite include embodiments where an anode consists of lithium titanium oxide and a carbon material and embodiments where an anode consists essentially of lithium titanium oxide and a carbon material.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A lithium-ion capacitor comprising a cathode, an anode, a porous separator positioned between the cathode and the anode, and lithium composite particles, wherein
    the cathode comprises activated carbon,
    the anode comprises lithium titanium oxide and a carbon material selected from the group consisting of hard carbon and graphite;
    the lithium composite particles are formed on a separator-facing surface of at least one of the cathode and the anode; and
    the lithium composite particles comprise a lithium metal core and a layer of a complex lithium salt encapsulating the core.

2. The lithium-ion capacitor according to claim 1, wherein the cathode comprises a layer of the activated carbon formed over a cathode current collector.

3. The lithium-ion capacitor according to claim 2, wherein a thickness of the activated carbon layer is between about 25 and 600 microns.

4. The lithium-ion capacitor according to claim 2, wherein the cathode current collector comprises aluminum foil.

5. The lithium-ion capacitor according to claim 1, wherein the anode comprises a composite layer of the lithium titanium oxide and the carbon material formed over an anode current collector.

6. The lithium-ion capacitor according to claim 5, wherein a thickness of the anode composite layer is between about 25 to 600 microns.

7. The lithium-ion capacitor according to claim 5, wherein the anode current collector comprises copper foil.

8. The lithium-ion capacitor according to claim 5, wherein the anode composite layer comprises from 5 to 50 wt. % lithium titanium oxide.

9. The lithium-ion capacitor according to claim 5, wherein the anode composite layer further comprises carbon black and a binder.

10. The lithium-ion capacitor according to claim 1, wherein the lithium titanium oxide comprises $Li_2TiO_3$ or $Li_4T_5O_{12}$.

11. The lithium-ion capacitor according to claim 1, wherein the lithium composite particles are provided as a contiguous layer on the separator-facing surface of the anode.

12. The lithium-ion capacitor according to claim 1, further comprising an electrolyte solution.

13. A method of producing a lithium-ion capacitor, comprising:
    providing a cathode comprising an activated carbon layer, an anode comprising a composite layer of lithium titanium oxide and a carbon material selected from the group consisting of hard carbon and graphite, and a separator,
    positioning the separator between the activated carbon layer and the composite layer; and
    providing lithium composite particles on a separator-facing surface of at least one of the activated carbon layer and the composite layer, wherein the lithium composite particles comprise a lithium metal core and a layer of a complex lithium salt encapsulating the core.

14. The method according to claim 13, wherein the anode composite layer comprises from 5 to 50 wt. % lithium titanium oxide.

15. The method according to claim 13, wherein the lithium composite particles have an average particle size of about 500 microns or less.

16. The method according to claim 13, wherein the lithium composite particles are provided as a contiguous layer.

17. The method according to claim 13, wherein the anode composite layer further comprises carbon black and a binder.

18. The lithium ion capacitor according to claim 1, wherein the layer of complex lithium salt encapsulating the lithium metal core has a thickness ranging from about 0.1 to about 300 microns.

* * * * *